W. H. LOOMIS.
Straw Stacker.

No. 46,918. Patented March 21, 1865.

Witnesses:
R. T. Campbell
E. Schafer

Inventor:
W. H. Loomis
by his atty's
Mason, Fenwick & Lawrence.

UNITED STATES PATENT OFFICE.

WILLIAM H. LOOMIS, OF FAIRFIELD, IOWA.

CHAFF AND STRAW STACKER.

Specification forming part of Letters Patent No. 46,918, dated March 21, 1865.

*To all whom it may concern:*

Be it known that I, WILLIAM H. LOOMIS, of Fairfield, county of Jefferson, and State of Iowa, have invented a new and Improved Straw and Chaff Stacker; and I do hereby declare that the following is a full, clear, and exact description thereof, reference being had to the accompanying drawings, making a part of this specification, in which—

Figure 1:
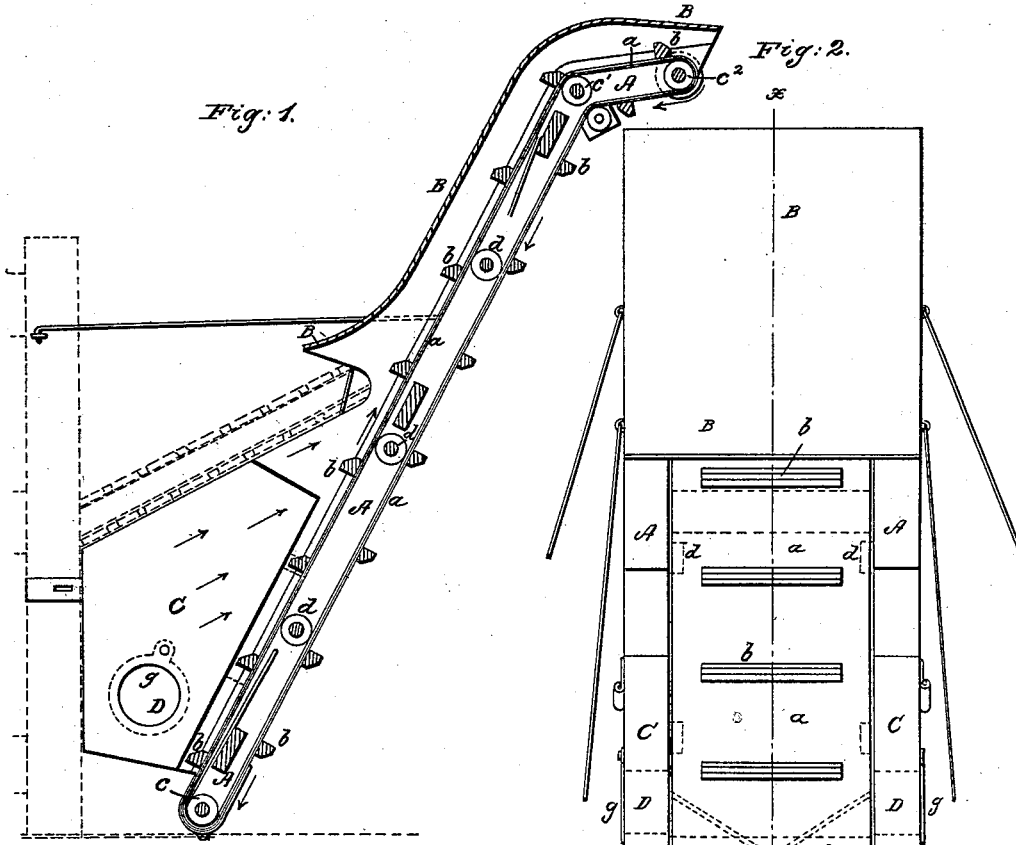
Figure 2:
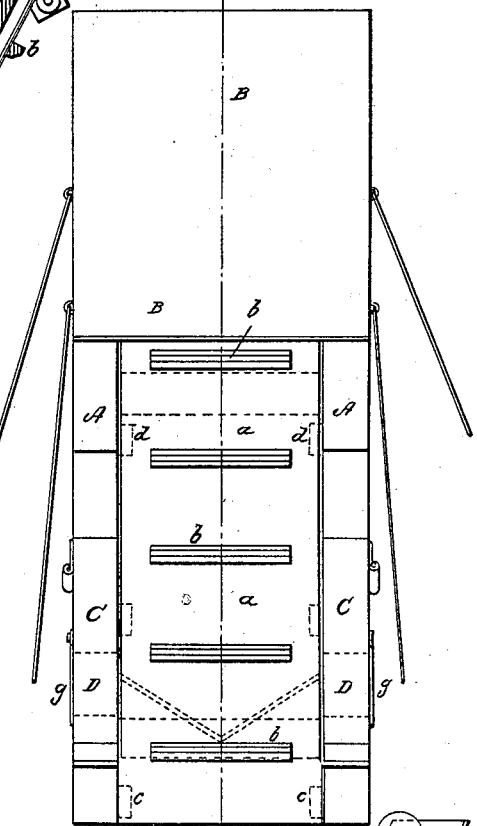
Figure 3:
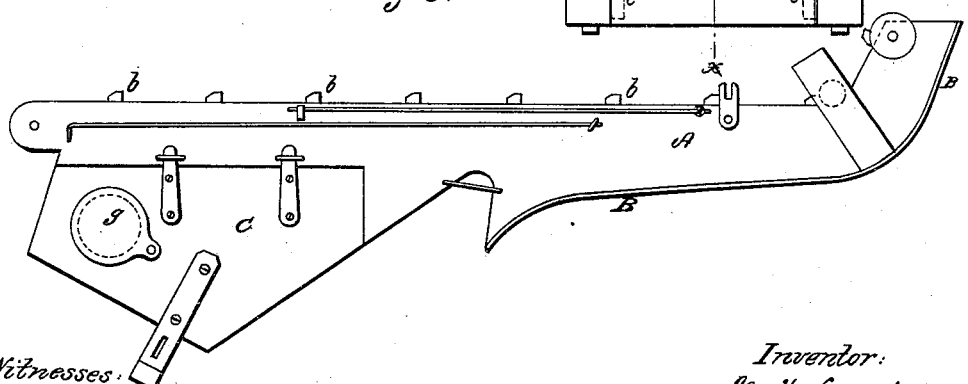

Figure 1 is a vertical section through my stacker arranged for operation. Fig. 2 is a top view of the stacker. Fig. 3 is a view of one side of the stacker.

Similar letters of reference indicate corresponding parts in the three figures.

The object of my invention is to provide a contrivance for conducting off the straw and chaff from a thrashing-machine and delivering the same in stacks alongside of the machine, said contrivance being so constructed that it can be readily attached to or removed from a thrashing-machine at pleasure, and when attached and arranged for operation the sides as well as the top are housed in in such manner that the straw is delivered upon the elevator or stacking apron at a point above that where the chaff is delivered upon said apron, thus enabling me to conduct the operation in the field as well as in a barn, as will be hereinafter described.

To enable others skilled in the art to make and use my invention, I will describe its construction and operation.

In the accompanying drawings, Fig. 1, I have represented my improved stacker erected in position for operation, and attached to the discharging end of a thrashing-machine, a part of which latter is indicated in red lines. Said stacker consists of an endless apron, $a$, which is provided with transverse slats $b\ b$, arranged at proper intervals apart, and secured on its outside surface in such manner as to form ledges for preventing straw or chaff from falling backward during the operation of conducting them from the thrasher. This apron $a$ is stretched over rollers $c\ c'\ c^2$, which have their bearings in the closed sides of the frame A, and at intermediate points between said rollers. Other rollers, $d\ d$, are used for supporting the apron and preventing it from bagging when the straw or chaff is delivered upon it. To the highest and the lowest set of rollers $c\ c^2$ are applied pulleys, by means of which motion can be communicated from the driving machinery of the thrasher to move said apron in the direction indicated by the arrows in Figs. 1 and 2.

The upper portion of my stacker is constructed in the form of a trunk with its top covered by a hood, B, which is curved at its upper end, so as to discharge the straw or chaff, or both, downward, as shown in Fig. 1. The lower end of this cover B flares outward, so as to form a wide receiving-mouth for the straw to enter the trunk and be carried through the same by the endless apron $a$. Below this flaring opening the sides of the stacker are closed by detachable wings C C, which are so formed as to close up all that portion of the thrasher below the straw-carrier from which the chaff is discharged. The straw carrier closes the upper portion of the chamber formed by the two side wings, C C, and apron $a$, and the straw is delivered upon the apron $a$ at a point above that where the chaff is discharged upon this apron. By thus housing in the chaff-delivery opening of the thrasher, and at the same time discharging the straw into a closed trunk, it will be seen that both straw and chaff are effectually prevented from being blown about by the wind until delivered from the upper end of the stacker upon the stack. The side wings, C C, are provided with pins and catches, or other contrivances, which will enable me to readily attach them to the frames of the thrasher and stacker, as shown in Figs. 1 and 3. These wings are removable for the purpose of enabling me to readily get at the shoes of the thrasher without the necessity of removing the entire stacker for this purpose. I also make openings D D for armholes through the wings C C, and cover these holes with hinged doors $g\ g$, which when opened will admit the arm of a person should it be desired to get at any of the movable parts of the chaff screen without removing the wings C C.

The bottom of the chaff chamber may be left open, as shown in Fig. 1, as the current of air which blows the chaff out of the thrasher will assist its passage up the inclined apron $a$.

What I claim as new, and desire to secure by Letters Patent, is—

1. A stacker which is so constructed as to receive the straw and chaff from a thrashing-machine upon an elevator, and within chambers which are closed at their sides, substantially as described.

2. The removable wings C C, in combination with a trunk which is adapted for receiving the straw directly from a straw-carrier of a thrashing-machine, substantially as described.

3. The arm-holes D D through the wings C C, arranged substantially as and for the purpose described.

Witness my hand in matter of my application for a patent for improved chaff and straw stacker.

WILLIAM H. LOOMIS.

Witnesses:
R. T. CAMPBELL,
E. SCHAFER.